(12) United States Patent
Ito

(10) Patent No.: US 9,517,823 B2
(45) Date of Patent: Dec. 13, 2016

(54) OUTBOARD MOTOR FUEL SUPPLY UNIT

(71) Applicant: SUZUKI MOTOR CORPORATION, Hamamastsu-shi, Shizuoka (JP)

(72) Inventor: Jun Ito, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 15/058,549

(22) Filed: Mar. 2, 2016

(65) Prior Publication Data

US 2016/0176491 A1 Jun. 23, 2016

Related U.S. Application Data

(63) Continuation of application No. PCT/JP2015/059394, filed on Mar. 26, 2015.

(30) Foreign Application Priority Data

Apr. 3, 2014 (JP) .................................. 2014-077276

(51) Int. Cl.
*F02M 37/00* (2006.01)
*B63H 20/00* (2006.01)
(Continued)

(52) U.S. Cl.
CPC ........... *B63H 20/001* (2013.01); *B01D 36/001* (2013.01); *F02B 61/045* (2013.01);
(Continued)

(58) Field of Classification Search
CPC ...... B63H 20/001; F02M 37/22; F02M 37/20; F02M 37/007; F02M 37/0076; F02M 59/16; F02M 61/16; F02M 62/0265; F02B 61/045; F02B 75/007
See application file for complete search history.

(56) References Cited

U.S. PATENT DOCUMENTS 5,103,793 A * 4/1992 Riese ...................... F02M 37/08
 123/509
5,231,967 A   8/1993 Baltz et al.
(Continued)

FOREIGN PATENT DOCUMENTS

JP   H0626415 A   2/1994
JP   H0942097 A   2/1997
(Continued)

OTHER PUBLICATIONS

International Preliminary Report on Patentability mailed Oct. 13, 2016 and translation of PCT Written Opinion of ISA mailed Jun. 23, 2015 issued in corresponding PCT International Application No. PCT/JP2015/059394.

*Primary Examiner* — Thomas Moulis
(74) *Attorney, Agent, or Firm* — Troutman Sanders LLP

(57) ABSTRACT

A fuel supply unit includes a vapor separator that performs vapor-liquid separation for fuel pumped up by a low-pressure fuel pump; a fuel filter that filters the fuel subjected to vapor-liquid separation in the vapor separator; an in-line type high-pressure fuel pump that has an inlet port for receiving the fuel filtered by the fuel filter and pumping the fuel received from the inlet port from an outlet port, the inlet port being located under a fuel liquid level of the vapor separator; a fuel injector that injects the fuel pumped by the high-pressure fuel pump to the engine; and a fuel flow path connected from the vapor separator to the inlet port of the high-pressure fuel pump via a lower side of the inlet port of the high-pressure fuel pump, wherein the fuel filter is arranged in the lowermost part of the fuel flow path.

5 Claims, 7 Drawing Sheets

(51) Int. Cl.

| | | |
|---|---|---|
| *F02M 37/22* | (2006.01) | |
| *B01D 36/00* | (2006.01) | |
| *F02M 37/20* | (2006.01) | |
| *F02B 61/04* | (2006.01) | |
| *F02M 59/16* | (2006.01) | |
| *F02M 61/16* | (2006.01) | |
| *F02B 75/00* | (2006.01) | |
| *F02M 63/02* | (2006.01) | |

(52) U.S. Cl.
CPC ......... *F02B 75/007* (2013.01); *F02M 37/007* (2013.01); *F02M 37/0076* (2013.01); *F02M 37/20* (2013.01); *F02M 37/22* (2013.01); *F02M 59/16* (2013.01); *F02M 61/16* (2013.01); *F02M 63/0265* (2013.01)

(56) References Cited

U.S. PATENT DOCUMENTS

| 5,501,202 | A | * | 3/1996 | Watanabe | F02B 61/045 |
| | | | | | 123/195 P |
| 5,797,378 | A | * | 8/1998 | Kato | F02B 61/045 |
| | | | | | 123/198 E |
| 2002/0166605 | A1 | | 11/2002 | Wada et al. | |
| 2005/0109685 | A1 | | 5/2005 | Fujita et al. | |
| 2013/0178120 | A1 | | 7/2013 | Takewaki et al. | |

FOREIGN PATENT DOCUMENTS

| JP | 2002339827 A | 11/2002 |
| JP | 2005155347 A | 6/2005 |
| JP | 2013142316 A | 7/2013 |
| JP | 2013200030 A | 10/2013 |

* cited by examiner

OUTBOARD MOTOR FUEL SUPPLY UNIT

CROSS-REFERENCE TO RELATED APPLICATIONS

This application is a continuation application of International Application PCT/JP2015/059394, filed on Mar. 26, 2015 and designated the U.S., which claims the benefit of priority of the prior Japanese Patent Application No. 2014-077276, filed on Apr. 3, 2014, the entire contents of which are incorporated herein by reference.

TECHNICAL FIELD

The present invention relates to an outboard motor fuel supply unit for supplying fuel stored in a fuel tank to an engine.

BACKGROUND ART

In general, an outboard motor widely used in a small boat has a fuel supply unit in order to supply fuel stored in a fuel tank to an engine. In the fuel supply unit, the fuel is pumped by a fuel pump to a fuel injector. As such a fuel pump, there are known an in-tank type fuel pump embedded in a vapor separator or a so-called in-line type fuel pump provided separately from the vapor separator and disposed in the middle of the fuel flow path.

In Patent Literature 1, there is discussed a fuel injection device in which fuel inside a fuel tank is supplied to a vapor separator by using a first fuel pump, so that the fuel under a fuel liquid level formed inside the vapor separator is supplied to a fuel distribution pipe by using an in-line type second electric fuel pump disposed outside the vapor separator, and the fuel is injected and supplied to the engine by using a fuel injection valve installed in the fuel distribution pipe.

In Patent Literature 2, there is discussed an outboard motor fuel supply unit provided with a vapor separator that performs vapor-liquid separation for the fuel supplied from a fuel tank by a low-pressure fuel pump to discharge the fuel vapor to the air, a fuel cooler, and an in-line high-pressure fuel pump connected in the middle of a fuel pipe connected to a side face of the fuel cooler.

In comparison with the in-tank type fuel pump, the in-line type fuel pump makes it possible to reduce the entire size of the outboard motor because individual components can be miniaturized although the number of components increases. In addition, since the fuel pump can be miniaturized, it is possible to allow for freedom in a design of the fuel pump. In addition, it is possible to improve starting performance of the engine by arranging the fuel pump in the vicinity of the fuel injector.

CITATION LIST

Patent Literature

Patent Literature 1: Japanese Laid-open Patent Publication No. 9-42097
Patent Literature 2: Japanese Laid-open Patent Publication No. 2013-142316

SUMMARY OF INVENTION

Technical Problem

Meanwhile, the in-line type high-pressure fuel pump has a complicated structure compared to the in-tank type fuel pump. In addition, it is necessary to arrange the fuel filter such that dust intrusion and degradation of performance can be prevented. However, since the fuel filter of the in-line type fuel pump has a tight mesh screen, the fuel filter may be clogged by bubbles on a filtering surface, and the amount of fuel passing through the filtering surface may be reduced disadvantageously.

In view of the aforementioned problems, it is therefore an object of the present invention to provide an outboard motor fuel supply unit, capable of maintaining performance of a fuel pump by preventing clogging of bubbles on a filtering surface of a fuel filter.

Solution to Problem

According to an aspect of the present invention, there is provided an outboard motor fuel supply unit for supplying an engine with fuel stored in a fuel tank, including: a low-pressure fuel pump that pumps up the fuel from the fuel tank; a vapor separator that performs vapor-liquid separation for the fuel pumped up by the low-pressure fuel pump; a fuel filter that filters the fuel subjected to the vapor-liquid separation in the vapor separator; an in-line type high-pressure fuel pump that has an inlet port for receiving the fuel filtered by the fuel filter and pumping the fuel received from the inlet port from an outlet port, the inlet port being located under a fuel liquid level of the vapor separator; a fuel injector that injects the fuel pumped by the high-pressure fuel pump to the engine; and a fuel flow path connected from the vapor separator to the inlet port of the high-pressure fuel pump via a lower side of the inlet port of the high-pressure fuel pump, wherein the fuel filter is arranged in the lowermost part of the fuel flow path.

Advantageous Effects of Invention

According to the present invention, it is possible to maintain performance of the fuel pump by preventing clogging of bubbles on the filtering surface of the fuel filter.

DESCRIPTION OF EMBODIMENTS

A description will now be made for preferable embodiments of the present invention with reference to the accompanying drawings. It is noted that, in each of the drawings, the arrow Fr denotes a front side (forward direction of a ship hull) of an outboard motor 1 when it is mounted on the ship hull, the arrow Rr denotes a rear side of the outboard motor 1 (backward direction of the ship hull), the arrow R denotes a right side of the outboard motor 1, and the arrow L denotes a left side of the outboard motor 1.

Figure 1:
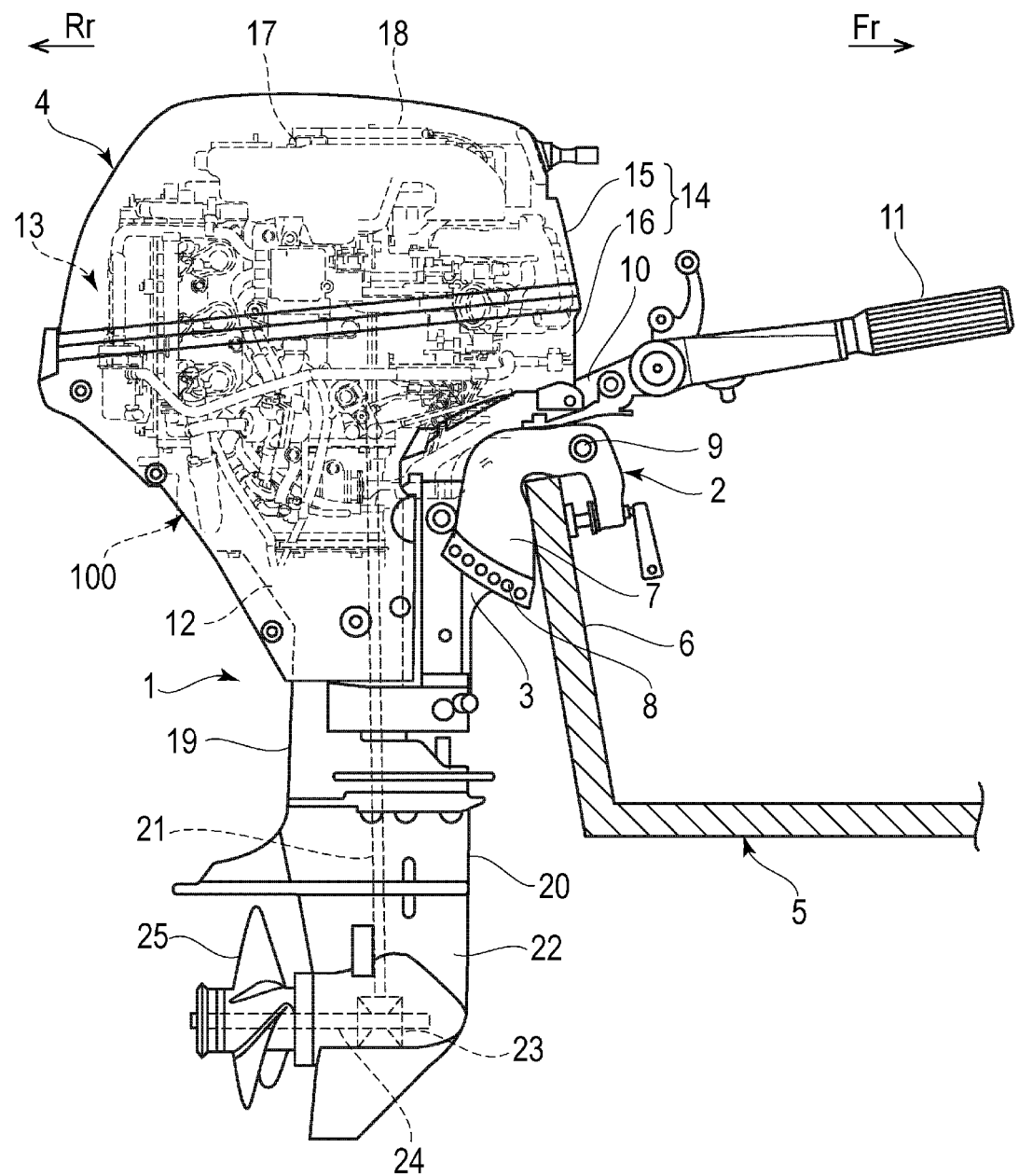
FIG. 1 is a right side view illustrating an outboard motor 1.

FIG. 1 is a right side view illustrating an outboard motor 1 provided with a fuel supply unit 100 according to this embodiment.

The outboard motor 1 has a pair of left and right clamp brackets 2, a swivel bracket 3 provided tiltably in a vertical direction against the clamp bracket 2, and an outboard motor body 4 supported by the swivel bracket 3.

Each clamp bracket 2 is fixed to the ship hull 5 by clamping an upper end of a stem plate 6, and leg portions 7 of the clamp brackets 2 are formed to face each other in parallel. In each leg portion 7, a plurality of pin holes 8 are bored and are arranged in an approximately arc shape with respect to the tilt shaft 9 as seen in a side view.

The swivel bracket 3 is interposed between the clamp brackets 2. The swivel bracket 3 has an upper portion rotatably supported by upper portions of the clamp brackets 2 with respect to the tilt shaft 9 so as to be tilted up in a vertical direction. In a rear part of the swivel bracket 3, a pivot shaft (not shown) is pivotably provided and is connected to the outboard motor body 4. In addition, an upper end of the pivot shaft protrudes to the front side to form a steering bracket 10. A steering handle 11 is rotatably installed to the steering bracket 10.

The engine 13 is installed in an upper portion of the outboard motor body 4 while it is supported by the engine holder 12. The surrounding of the engine 13 is covered by an engine cover 14. The engine cover 14 is vertically dividable into upper and lower covers 15 and 16. The upper part of the engine 13 is covered by the upper cover 15, and the lower part of the engine 13 is covered by the lower cover 16.

A crankshaft (not shown) is nearly vertically provided inside the engine 13. A recoil 17 is provided in an upper end of the crankshaft, and a manual starter rope (not shown) is wound around the recoil 17. In addition, an upper side of the recoil 17 is covered by a recoil cover 18.

A drive shaft housing 20 is provided under the engine cover 14 across an oil pan 19. Inside the oil pan 19 and the drive shaft housing 20, a drive shaft 21 connected to the lower end of the crankshaft is provided to extend downward. The drive shaft 21 drives a propeller 25 by using a bevel gear 23 and a propeller shaft 24 inside the gear casing 22 provided in a lower part of the drive shaft housing 20.

Figure 2:
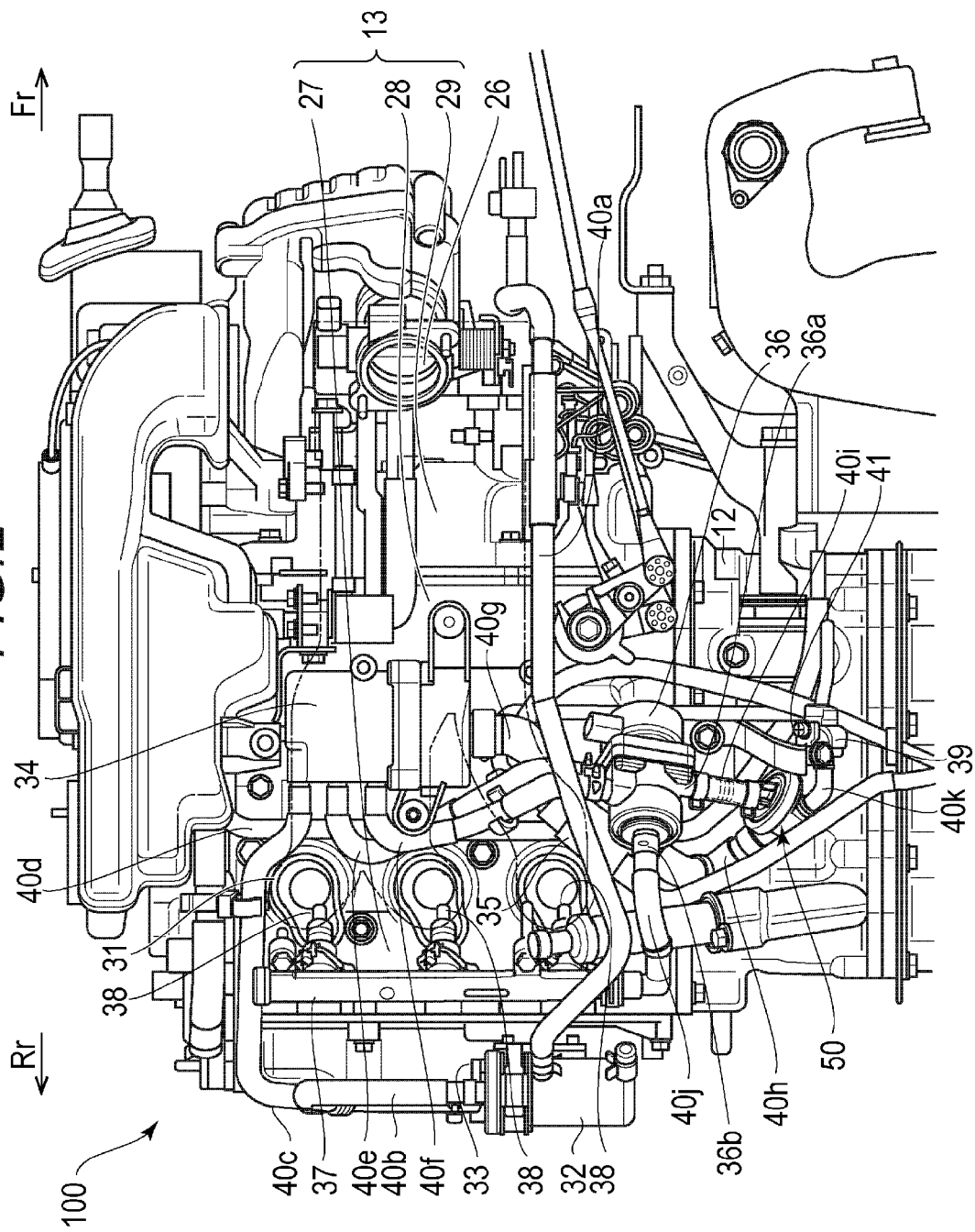
FIG. 2 is a right side view illustrating an engine 13.
Figure 3:
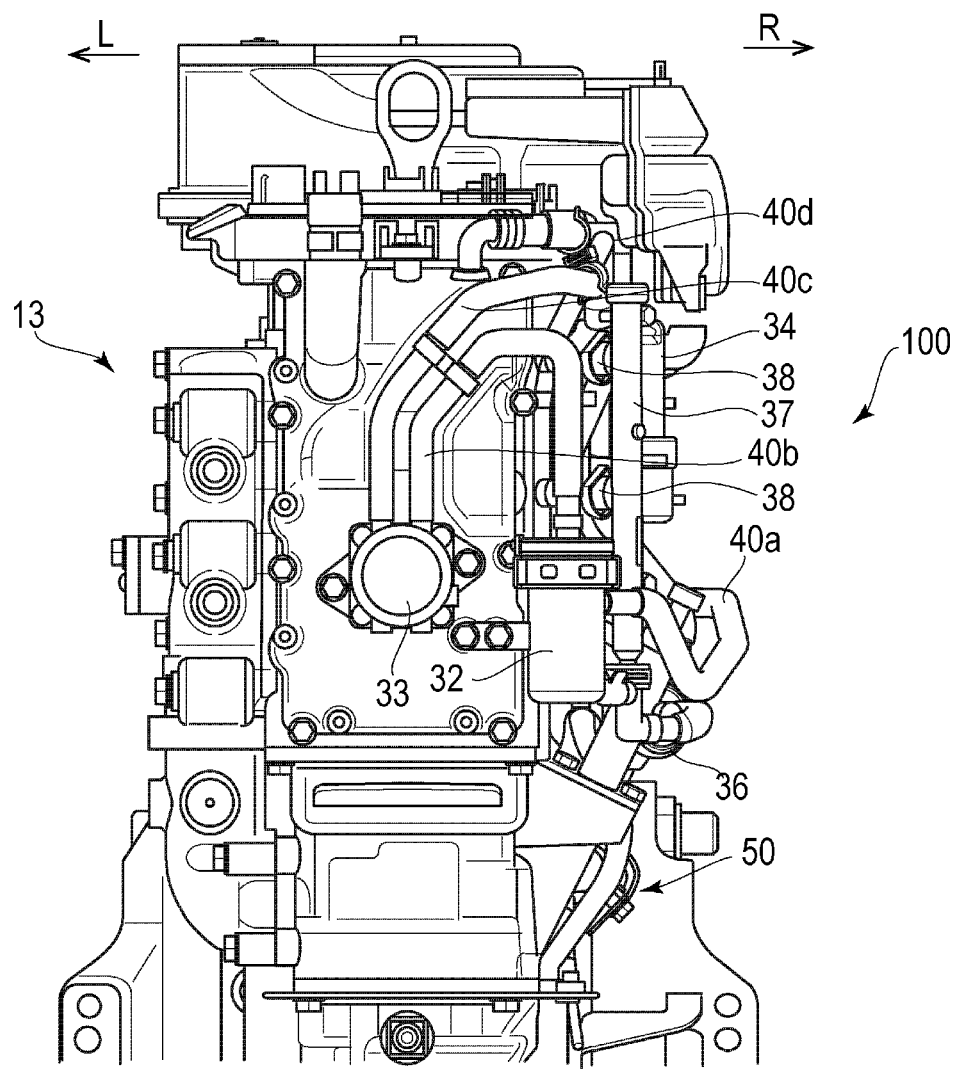
FIG. 3 is a rear view illustrating the engine 13.
Figure 4:
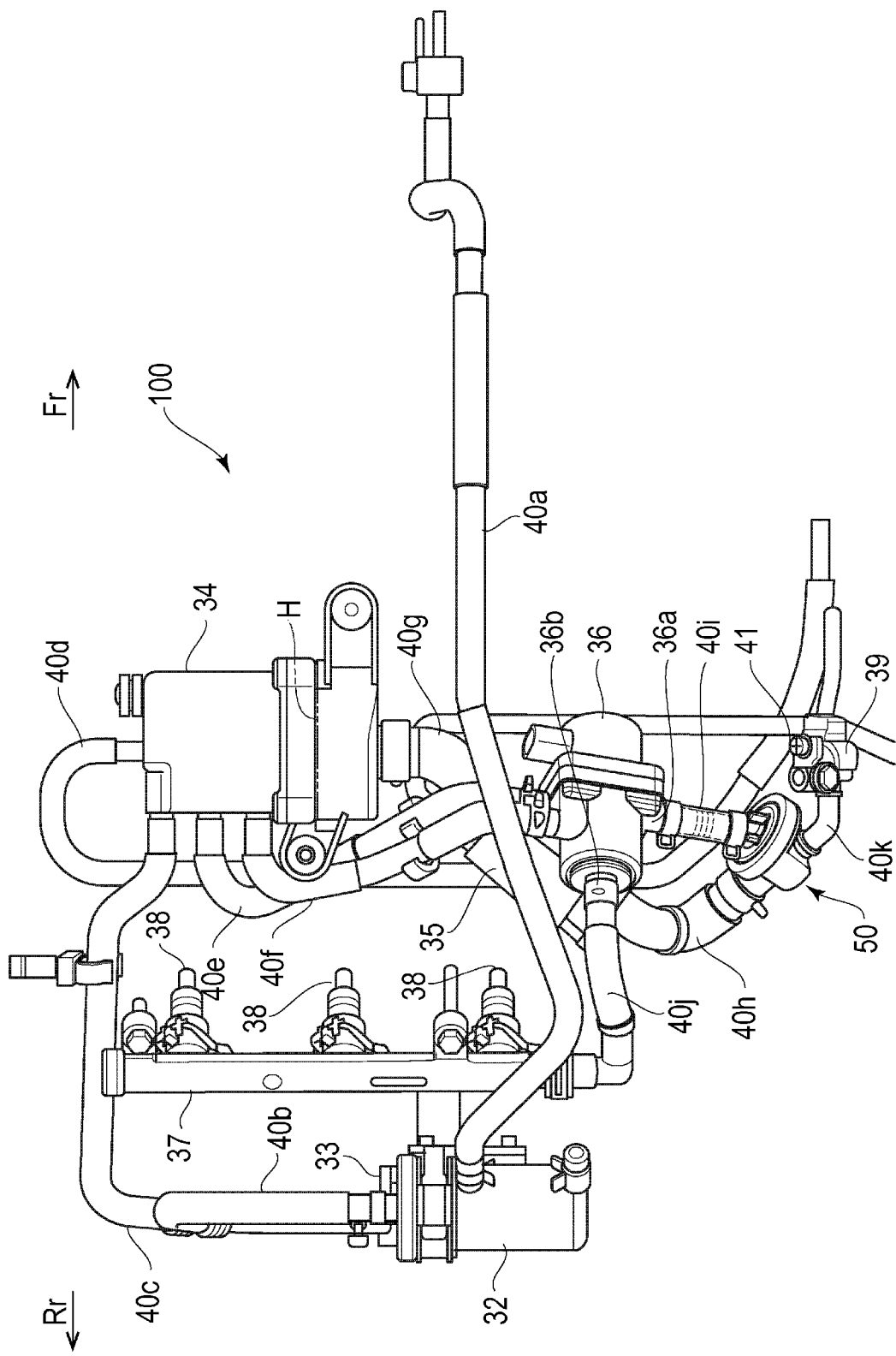
FIG. 4 is a right side view illustrating a fuel supply unit 100.
Figure 5:
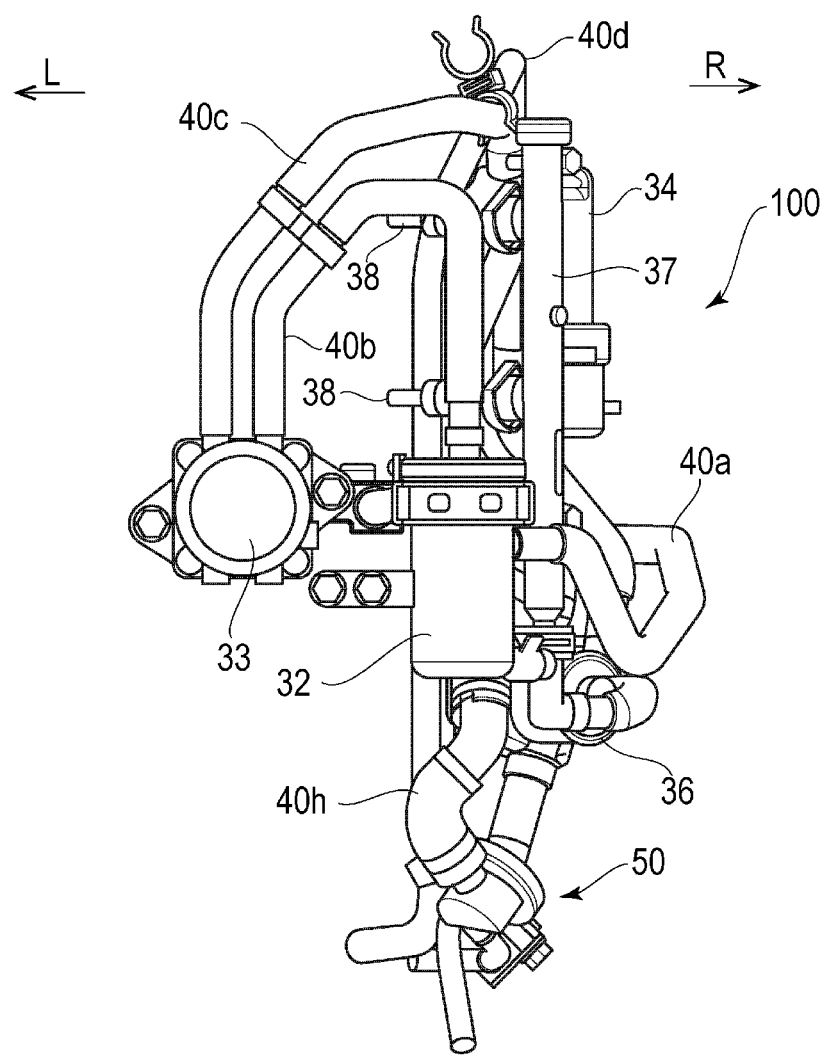
FIG. 5 is a rear view illustrating the fuel supply unit 100.

A description will now be made for the fuel supply unit 100 according to this embodiment with reference to FIGS. 2 to 6. FIG. 2 is a right side view illustrating the engine 13 provided with the fuel supply unit 100. FIG. 3 is a rear view illustrating the engine 13 provided with the fuel supply unit 100. It is noted that, in FIG. 2, an intake manifold connected to each intake port 31 from the throttle body 26 is indicated by a two-dotted dashed line. FIG. 4 is a right side view illustrating the fuel supply unit 100, and FIG. 5 is a rear view illustrating the fuel supply unit 100.

The engine 13 according to this embodiment is, for example, a water-cooled four-cycle three-cylinder engine. As illustrated in FIG. 2, the engine 13 is formed by assembling a cylinder head 27, a cylinder block 28, a crankcase 29, and the like. Inside the cylinder head 27, an intake port 31 and an exhaust port (not shown) connected to the combustion chamber are provided. A fuel injector 38 that injects fuel to the inside of the intake port 31 is installed to the cylinder head 27 while it is supported by a delivery pipe 37.

A fuel supply unit 100 is arranged around the engine 13. The fuel supply unit 100 supplies the intake port 31 of the engine 13 with the fuel such as gasoline stored in a fuel tank (not shown) provided in the ship hull 5 side. The fuel supply unit 100 includes various components such as a first fuel filter 32, a low-pressure fuel pump 33, a vapor separator 34, a fuel cooler 35, a second fuel filter 50, a high-pressure fuel pump 36, a delivery pipe 37, and a fuel injector 38, arranged sequentially from the fuel tank side to the intake port 31 side.

The first fuel filter 32 has an approximately circular columnar shape and is arranged in a rear part of the right side of the engine 13 and in the lower part of the engine 13. A fuel pipe 40a extending from the fuel tank across the right side of the engine 13 to the rear side is connected to an outer circumferential surface of the first fuel filter 32. The first fuel filter 32 removes relatively large dust particles contained in the fuel.

A fuel pipe 40b is connected to an upper surface of the first fuel filter 32. As illustrated in FIGS. 3 and 5, the fuel pipe 40b is erected approximately vertically, is declined to the left side, and is then connected to the right side of the upper surface of the low-pressure fuel pump 33.

The low-pressure fuel pump 33 has a flat circular columnar shape and is arranged in nearly the same height as that of the first fuel filter 32 on the rear face of the engine 13. The low-pressure fuel pump 33 pumps up the fuel from the fuel tank.

A fuel pipe 40c is connected to the left side on the upper surface of the low-pressure fuel pump 33. As illustrated in FIGS. 2 and 4, the fuel pipe 40c is erected approximately vertically, is inclined to the right side, extends to the front side, and is then connected to an upper portion of the rear surface of the vapor separator 34.

The vapor separator 34 has an approximately circular columnar shape and is arranged in the right side of the cylinder block 28 and in the upper part of the engine 13. It is noted that the vapor separator 34 is located between the cylinder block 28 and the intake manifold indicated by the two-dotted dashed line of FIG. 2. The vapor separator 34 performs vapor-liquid separation for the fuel. A vapor discharge pipe 40d is connected to the upper surface of the vapor separator 34. The vapor discharge pipe 40d is erected approximately vertically, is curved to the rear side, extends downward, and then extends to the front side. The vapor discharge pipe 40d is used to discharge the vapor separated from the fuel by the vapor separator 34 to the air. In addition, first and second return pipes 40e and 40f are vertically separately arranged and are connected to the center of the rear face of the vapor separator 34. Each of the first and second return pipes 40e and 40f extends downward and is then connected to the high-pressure fuel pump 36. The first return pipe 40e is used to return the fuel remaining in the high-pressure fuel pump 36 to the vapor separator 34, and the second return pipe 40f is used to return bubbles generated from the high-pressure fuel pump 36 to the vapor separator 34. Furthermore, the fuel pipe 40g is connected to the lower face of the vapor separator 34. The fuel pipe 40g extends downward and is connected to the fuel cooler 35.

The fuel cooler 35 has an approximately rectangular shape and is arranged in the right side with respect to a boundary between the cylinder head 27 and the cylinder block 28 in the lower part of the engine 13. The fuel cooler 35 cools the fuel by using seawater and the like. A fuel pipe 40h is connected to a lower surface of the fuel cooler 35. The fuel pipe 40h extends downward and is then connected to the second fuel filter 50.

The second fuel filter 50 is arranged in the right side of the engine holder 12. The second fuel filter 50 removes relatively fine dust particles that are not easily removed by the first fuel filter 32. A specific structure of the second fuel filter 50 will be described below with reference to FIGS. 6 and 7.

A fuel pipe 40i is connected to the upper surface of the second fuel filter 50. The fuel pipe 40i extends upward and is connected to the high-pressure fuel pump 36.

The high-pressure fuel pump 36 has an approximately circular columnar shape and is arranged in the right side of the cylinder block 28 and in the lower part of the engine 13, so that the axial direction of the approximately circular columnar shape is the approximately front-back direction. The high-pressure fuel pump 36 according to this embodiment is a so-called in-line type fuel pump and is arranged in the middle of the fuel flow path.

The high-pressure fuel pump 36 has an inlet port 36a for receiving the fuel filtered by the second fuel filter 50 and an outlet port 36b for outputting the compressed fuel. The inlet port 36a is formed in the lower side of the outer circumferential surface of the high-pressure fuel pump 36 and is connected to the fuel pipe 40i. The outlet port 36b is formed on the rear surface of the high-pressure fuel pump 36 and is connected to the fuel pipe 40j. In addition, the first and second return pipes 40e and 40f are connected to the upper side of the outer circumferential surface of the high-pressure fuel pump 36.

The high-pressure fuel pump 36 is disposed to be lower than the vapor separator 34 in height. More specifically, the inlet port 36a of the high-pressure fuel pump 36 is located under the fuel liquid level of the vapor separator 34 (refer to the liquid level H of FIG. 4).

The high-pressure fuel pump 36 compresses the fuel to adjust the pressure of the fuel by using a pressure regulator internally provided and pumps the compressed fuel from the outlet port 36b to the delivery pipe 37 through the fuel pipe 40j.

The delivery pipe 37 has a tubular shape and is arranged in the right side of the cylinder head 27 such that an axial direction of the pipe is in parallel with the vertical direction. The fuel injectors 38 are installed to the delivery pipe 37 with a predetermined vertical interval. The delivery pipe 37 distributes the fuel pumped by the high-pressure fuel pump 36 to each fuel injector 38.

The fuel injector 38 injects the fuel distributed by the delivery pipe 37 toward the intake port 31 at a predetermined timing.

According to this embodiment, in order to prevent fine dust particles from coming to the in-line type high-pressure fuel pump 36, the second fuel filter 50 is disposed immediately before the high-pressure fuel pump 36. The second fuel filter 50 has a filter member 60 having a tight mesh screen in order to remove any fine dust particle as described below. The filter member 60 also blocks bubbles or the like contained in the fuel. Therefore, the second fuel filter 50 according to this embodiment is configured to prevent the filter member 60 from being clogged by the bubbles and prevent the fuel passing through the filter member 60 from being reduced.

Specifically, in the fuel supply unit 100 according to this embodiment, a fuel flow path including the fuel pipes 40g, 40h, and 40i ranging from the vapor separator 34 to the high-pressure fuel pump 36 once passes through a lower side of the inlet port 36a of the high-pressure fuel pump 36 and is then connected to the inlet port 36a of the high-pressure fuel pump 36, and the second fuel filter 50 is arranged in the lowermost part of the aforementioned fuel flow path. Therefore, the bubbles contained in the fuel arriving at the second fuel filter 50 are raised through the fuel pipes 40h and 40g, so that clogging of the second fuel filter 50 is prevented.

Figure 6:
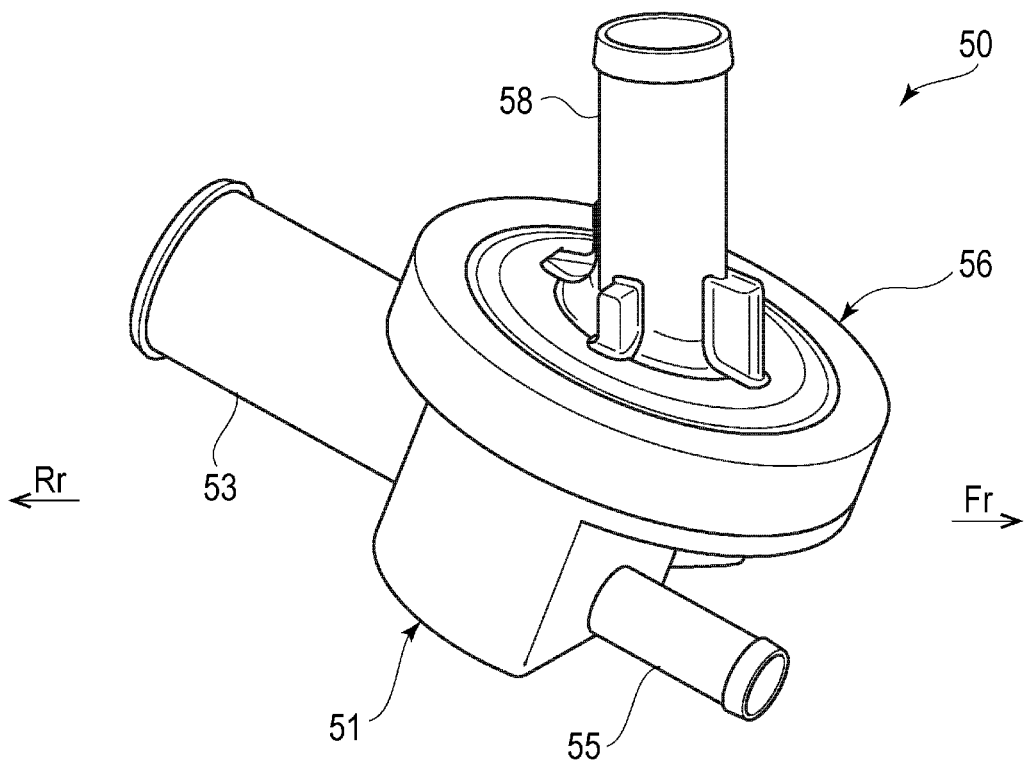
FIG. 6 is a perspective view illustrating a second fuel filter 50.
Figure 7:
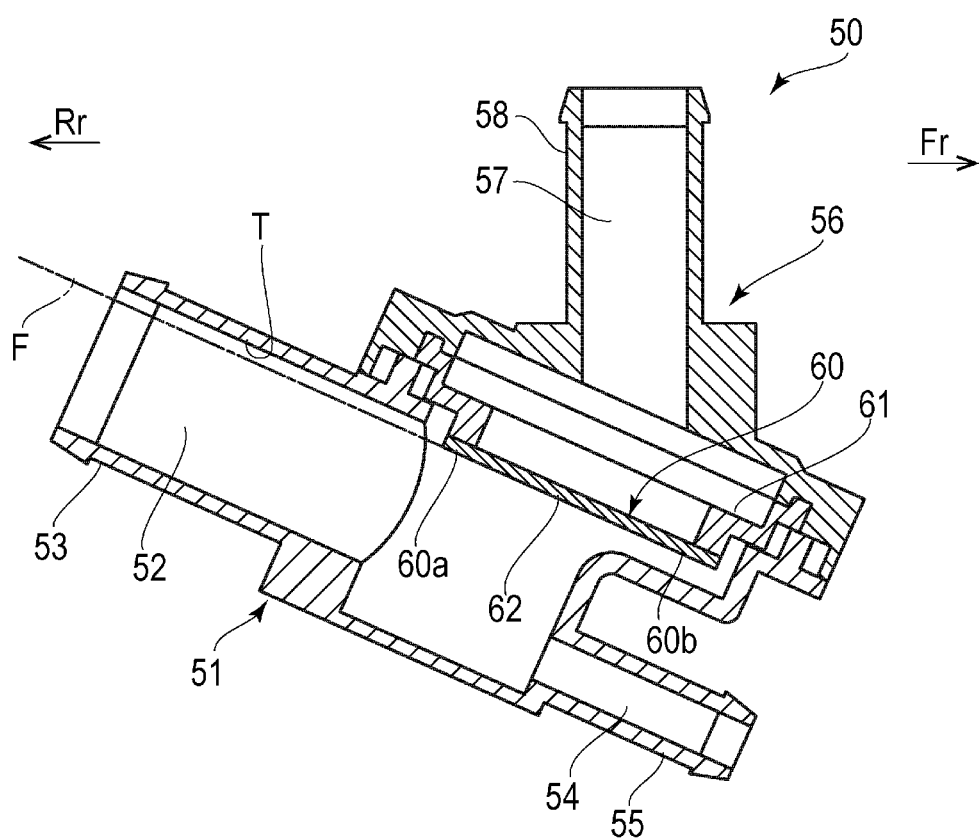
FIG. 7 is a cross-sectional view illustrating the second fuel filter 50.

Next, a description will be made for a specific configuration of the second fuel filter 50. FIG. 6 is a perspective view illustrating the second fuel filter 50. FIG. 7 is a cross-sectional view illustrating the second fuel filter 50.

The second fuel filter 50 according to this embodiment includes an inlet-side member 51, an outlet-side member 56, and a filter member 60. The second fuel filter 50 is assembled by vertically pinching the filter member 60 between the inlet-side member 51 and the outlet-side member 56.

The fuel not yet filtered by the filter member 60 flows to the inside of the underlying inlet-side member 51. The inlet-side member 51 includes a fuel inlet portion 53 having a fuel inlet hole 52 and a drain portion 55 having a drain hole 54.

The fuel inlet portion 53 has a cylindrical shape and is located in a rear part of the inlet-side member 51. The fuel pipe 40h is connected to the fuel inlet portion 53 by fitting the fuel pipe 40h to the external side of the fuel inlet portion 53. In addition, an axial line of the cylindrical shape of the fuel inlet portion 53 is inclined such that its front side is lowered, and its rear side is raised.

The drain portion 55 has a cylindrical shape and is located in a front part of the inlet-side member 51. The axial line of the cylindrical shape of the drain portion 55 is inclined in parallel with the axial line of the cylindrical shape of the fuel inlet portion 53 such that its front side is lowered, and its rear side is raised. According to this embodiment, the drain portion 55 is located in the lowermost part of the second fuel filter 50. It is noted that, as illustrated in FIG. 4, the drain pipe 40k is connected to the drain portion 55 by fitting the drain pipe 40k to the external side of the drain portion 55. In addition, a drain cork 39 is connected to the drain pipe 40k, and a drain screw 41 is screwed to the drain cork 39. By rotating the drain screw 41, the drain cork 39 is opened to drain the fuel of the fuel supply unit 100.

The fuel filtered by the filter member 60 flows to the inside of the overlying outlet-side member 56 from the inlet-side member 51 side. The outlet-side member 56 has a fuel outlet portion 58 having a fuel outlet hole 57.

The fuel outlet portion 58 has a cylindrical shape and is located in an upper part of the outlet-side member 56. The fuel pipe 40i is connected to the fuel outlet portion 58 by fitting the fuel pipe 40i into the external side of the fuel outlet portion 58. In addition, the fuel outlet portion 58 has an axial line of the cylindrical shape arranged along the vertical direction.

The filter member 60 vertically partitions the inside of the second fuel filter 50 into an upper side corresponding to a clean side provided with the fuel outlet hole 57 and a lower side corresponding to a dirty side provided with the fuel inlet hole 52. The filter member 60 has a flat plate shape, and more specifically, a disk shape, and its periphery is held by an annular holding member 61. The filter member 60 is positioned by nipping an outer periphery of the holding member 61 between the inlet-side member 51 and the outlet-side member 56.

While the filter member 60 is positioned, the filter member 60 is inclined such that one end 60a of the filter member 60 in the fuel inlet hole 52 side is higher than the other end 60b opposite to the one end 60a. According to this embodiment, the inclination angle of the filter member 60 matches the inclination of the axial line of the cylindrical shape of the fuel inlet portion 53.

As illustrated in FIG. 7, the filter member 60 is arranged such that an extension surface F obtained by extending the filtering surface 62 of the dirty side is lower than the upper end T of the fuel inlet hole 52 in height. It is noted that the filter member 60 may be arranged such that the extension surface F has the same height as that of the upper end T of the fuel inlet hole 52.

Since the filter member 60 has a disk shape, the filter area of the filter member 60 is reduced toward the one end 60a from the center of the filter member 60 as seen from the fuel outlet portion 58.

Next, a description will be made for operations of the fuel supply unit 100 configured as described above.

The fuel of the fuel tank is pumped by the low-pressure fuel pump 33 and is filtered by the first fuel filter 32. The fuel obtained by removing large dust particles flows to the inside of the vapor separator 34 and is subjected to vapor-liquid separation. The fuel obtained by removing vapor flows to the fuel cooler 35 through the fuel pipe 40g. The fuel cooled by the fuel cooler 35 is directed to the second fuel filter 50 through the fuel pipe 40h.

The fuel flowing through the fuel pipe 40h arrives at the dirty side of the second fuel filter 50 via the fuel inlet hole 52. The fuel arriving at the dirty side contains fine dust particles or bubbles not removed by the first fuel filter 32. The filter member 60 can prevent transmission of fine dust particles or bubbles that may generate performance degradation when they are input to the in-line type high-pressure fuel pump 36.

The fuel filtered by the second fuel filter 50 arrives at the clean side of the second fuel filter 50. The fuel arriving at the clean side flows to the high-pressure fuel pump 36 through the pipe 40i. The fuel flowing from the second fuel filter 50 is compressed by the high-pressure fuel pump 36 and is pumped to the delivery pipe 37 through the fuel pipe 40j. The pumped fuel is distributed to each fuel injector 38 through the delivery pipe 37 and is injected by the fuel injector 38 to the intake port 31.

Here, since the filter member 60 filters bubbles, the bubbles may be attached on the filtering surface 62 of the filter member 60. According to this embodiment, the filter member 60 having a flat plate shape is inclined such that the one end 60a of the fuel inlet hole 52 side is higher than the other end 60b. Therefore, as the engine 13 stops, and the fuel flow stops, bubbles are raised toward the one end 60a along the filtering surface 62. Therefore, it is possible to prevent clogging of bubbles on the filtering surface 62.

Since the filtering area of the filter member 60 is reduced toward the one end 60a from the center, bubbles are directed to the one end 60a along the filtering surface 62. Therefore, it is possible to more effectively prevent clogging of bubbles on the filtering surface 62.

In addition, since the extension surface F obtained by extending the filtering surface 62 is equal to or lower than the upper end T of the fuel inlet hole 52 in height, the bubbles raised toward the one end 60a of the filter member 60 are further raised along the fuel inlet hole 52. Therefore, the bubbles can be discharged from the second fuel filter 50, and can be returned to the vapor separator 34 via the fuel pipe 40h, the fuel cooler 35, and the fuel pipe 40g.

The second fuel filter 50 has the drain hole 54 in the lowermost part of the dirty side. Therefore, by releasing the drain cork 39, it is possible to drain the fuel remaining in the vapor separator 34, the fuel pipe 40g, the fuel cooler 35, the fuel pipe 40h, the fuel pipe 40i, the high-pressure fuel pump 36, and the like without any remnant. In this case, fine dust particles attached on the filtering surface 62 of the second fuel filter 50 are discharged from the drain hole 54 along with the fuel.

According to this embodiment, the second fuel filter 50 is arranged such that the one end 60a of the inclined filter member 60, which is higher, is located in the rear side of the outboard motor body 4, and the other end 60b, which is lower, is located in the front side of the outboard motor body 4. Therefore, even when the outboard motor body 4 is tilted up with respect to the tilt shaft 9, it is possible to hold the filter member 60 such that the one end 60a is higher than the other end 60b. Accordingly, even when the engine 13 stops, and the outboard motor body 4 is tilted up, it is possible to raise the bubbles attached on the filtering surface 62 along the fuel inlet hole 52 and return them to the vapor separator 34.

While the embodiments of the present invention have been described hereinbefore, it would be appreciated that they are not intended to limit the scope of the invention, and various changes or modifications can be possible within the scope of the present invention.

For example, although the engine 13 according to the embodiment of the present invention is a water-cooled four-cycle three-cylinder engine, the invention is not limited thereto.

For example, although the fuel supply unit 100 according to the embodiment of the present invention has the first and second fuel filters 32 and 50, the first fuel filter 32 may be omitted.

INDUSTRIAL APPLICABILITY

The present invention can be applied to an outboard motor fuel supply unit for supplying the engine with the fuel stored in the fuel tank.

The invention claimed is:

1. An outboard motor fuel supply unit for supplying an engine with fuel stored in a fuel tank, comprising:
   a low-pressure fuel pump that pumps up the fuel from the fuel tank;
   a vapor separator that performs vapor-liquid separation for the fuel pumped up by the low-pressure fuel pump;
   a fuel filter that filters the fuel subjected to the vapor-liquid separation in the vapor separator;
   an in-line type high-pressure fuel pump that has an inlet port for receiving the fuel filtered by the fuel filter and pumping the fuel received from the inlet port from an outlet port, the inlet port being located under a fuel liquid level of the vapor separator;
   a fuel injector that injects the fuel pumped by the high-pressure fuel pump to the engine; and
   a fuel flow path connected from the vapor separator to the inlet port of the high-pressure fuel pump via a lower side of the inlet port of the high-pressure fuel pump,
   wherein the fuel filter is arranged in the lowermost part of the fuel flow path.

2. The outboard motor fuel supply unit according to claim 1, wherein the fuel filter has a flat-plate-shaped filter member that partitions an internal space of the fuel filter into an upper side corresponding to a clean side provided with a fuel outlet hole and a lower side corresponding to a dirty side provided with a fuel inlet hole, and
   the filter member is inclined such that one end of the fuel inlet hole side is higher than the other end opposite to the one end.

3. The outboard motor fuel supply unit according to claim 2, wherein the filter member is arranged such that an extension surface obtained by extending the filtering surface is equal to or lower than an upper end of the fuel inlet hole in height.

4. The outboard motor fuel supply unit according to claim 2, wherein the fuel filter has a drain hole in the lowermost part of the dirty side.

5. The outboard motor fuel supply unit according to claim 2, wherein an outboard motor body of the outboard motor can be tilted up with respect to a tilt shaft, and
   the fuel filter is arranged such that the one end of the filter member is located closer to a rear side of the outboard motor body, compared to the other end.

\* \* \* \* \*